A. B. KNIGHT.
MACHINE FOR GRINDING EDGES OF GLASSWARE.
APPLICATION FILED APR. 9, 1919.

1,327,830. Patented Jan. 13, 1920.
5 SHEETS—SHEET 1.

Witness
Inventor
Albert B. Knight.
By
C. L. Parker
Attorney

A. B. KNIGHT.
MACHINE FOR GRINDING EDGES OF GLASSWARE.
APPLICATION FILED APR. 9, 1919.

1,327,830. Patented Jan. 13, 1920.
5 SHEETS—SHEET 3.

Witness

Inventor
Albert B. Knight,
By
C. L. Parker, Attorney

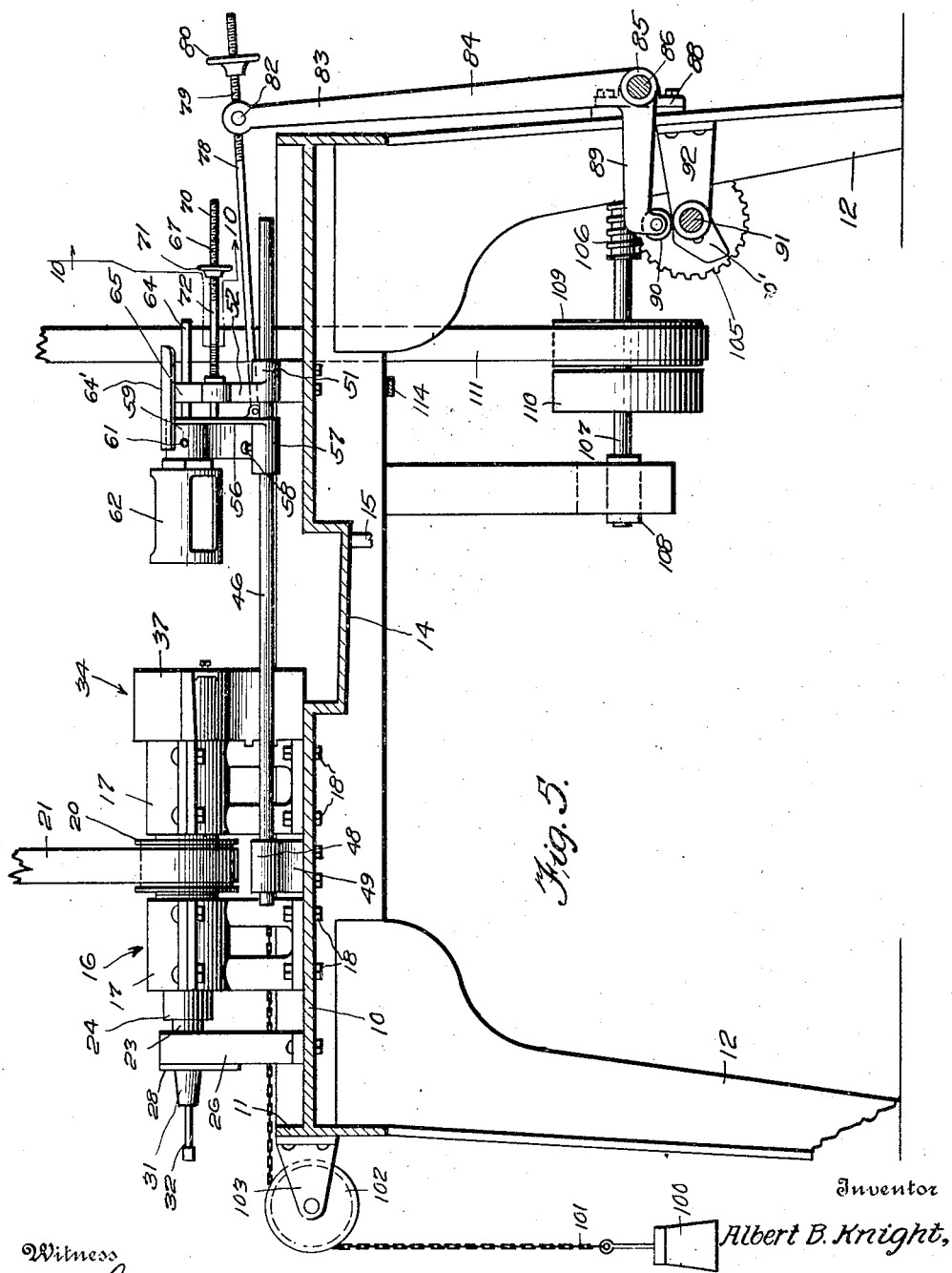

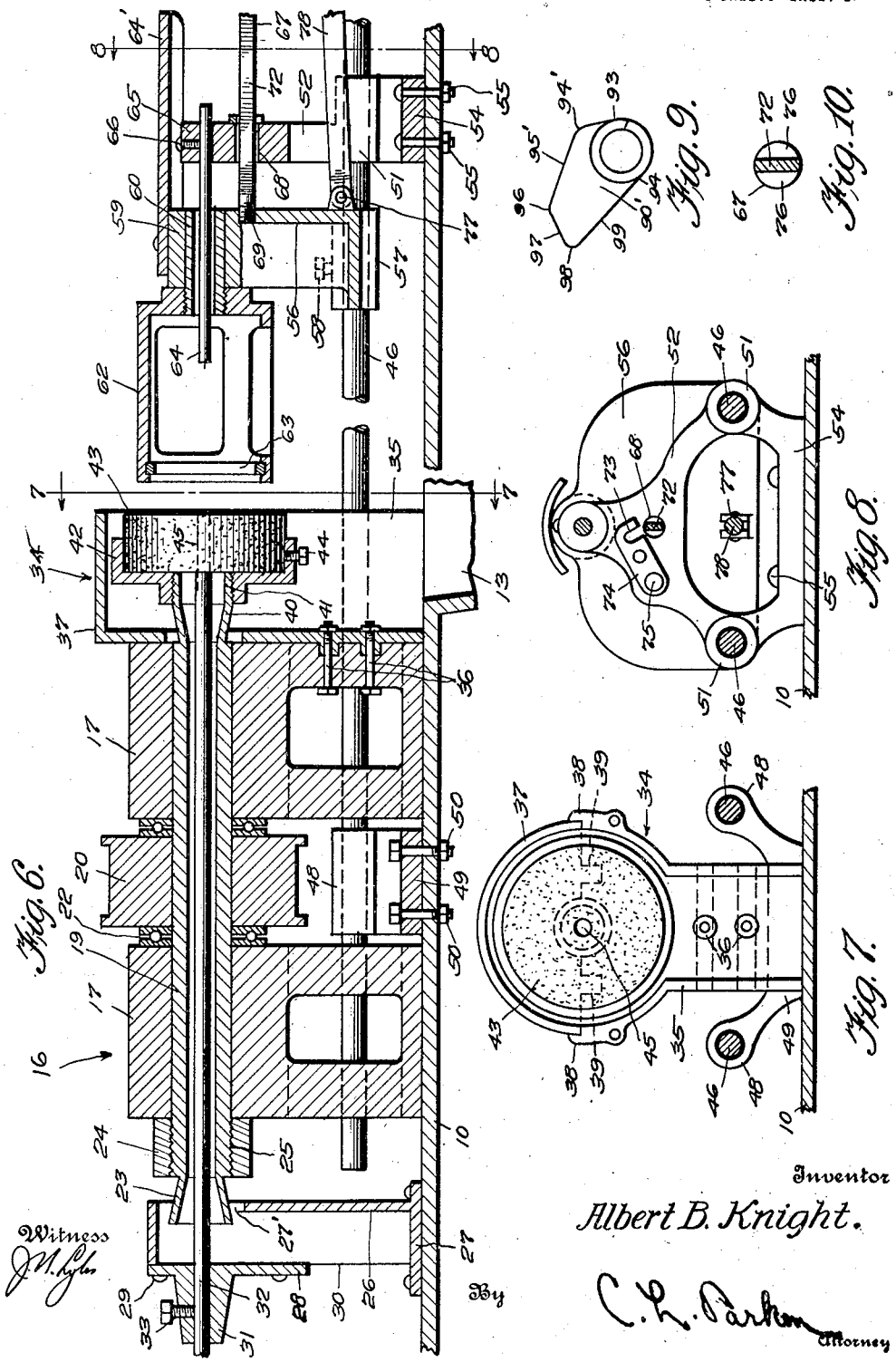

UNITED STATES PATENT OFFICE.

ALBERT BREAKENRIDGE KNIGHT, OF FAIRMONT, WEST VIRGINIA.

MACHINE FOR GRINDING EDGES OF GLASSWARE.

1,327,830.

Specification of Letters Patent. Patented Jan. 13, 1920.

Application filed April 9, 1919. Serial No. 288,680.

*To all whom it may concern:*

Be it known that I, ALBERT B. KNIGHT, a citizen of the United States, residing at Fairmont, in the county of Marion and State of West Virginia, have invented certain new and useful Improvements in Machines for Grinding Edges of Glassware, of which the following is a specification.

My invention relates to a machine for grinding the cracked off ends of glassware, such as drinking glasses, while not necessarily restricted to this use.

As far as I am aware, at the present time, the machine employed in grinding the cracked off ends of drinking glasses is manually operated to a considerable extent, such machines ordinarily employing four treadles, connected with the glass receiving chucks, to move them away from the grinding stones. These chucks are advanced to the grinding stones by weights. Such a machine is ordinarily operated by a woman who is compelled to stand upon one foot, and continuously operate the four treadles by the other foot. This work is found to be very tedious and frequently impairs the health of the operator. Further, it is found that such machines break a large number of glasses during the grinding operation.

Important objects of my invention are to provide means whereby the chucks are moved toward and away from the grinding stone wholly automatically; to provide means whereby the machine will operate with a reduced breakage of the glasses; to provide means whereby the operating means for the chucks holding the glasses is so timed in its movement that the glasses may be conveniently and properly introduced and removed therefrom; to provide means to eject the glasses from the chucks; to provide means for supplying water to the grinding stones without liability of the water being carried to the journal boxes or bearings of the spindles; to provide means whereby one or more of the chucks may be cut out of operation while the other chucks continue to operate; to provide a machine of the above-mentioned character which is strong, durable and reliable in operation; and to provide means for conveniently controlling the operation of the machine.

Other objects and advantages of the invention will be apparent during the course of the following description.

In the accompanying drawings forming a part of this specification, and in which like numerals are employed to designate like parts throughout the same:

Fig. 5 is a longitudinal sectional view, taken on line 5—5 of Fig. 1;

Fig. 6 is a central vertical longitudinal sectional view through one of the operating sets or units of the machine;

Fig. 7 is a transverse sectional view, taken on line 7—7 of Fig. 6;

Fig. 8 is a similar view, taken on line 8—8 of Fig. 6;

Fig. 9 is a side elevation of the cam, and

Fig. 10 is a transverse section taken on line 10—10 of Fig. 2.

Figure 1:
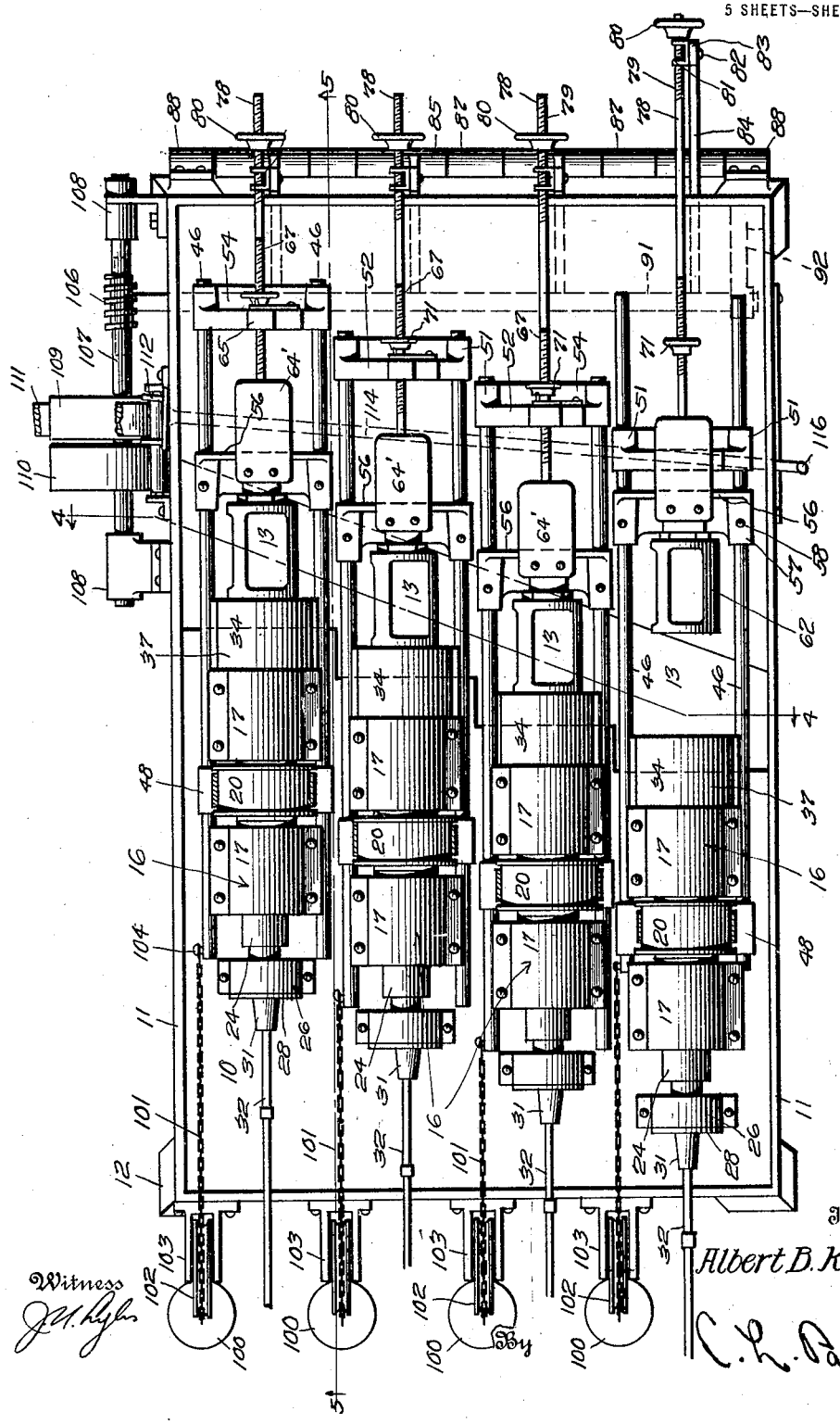
Figure 1 is a plan view of a machine embodying my invention.

In the drawings, wherein for the purpose of illustration, is shown a preferred embodiment of my invention, the numeral 10 designates a preferably horizontal support, having a rectangular upstanding flange 11, constituting a tray. This support or tray is arranged upon legs 12, as shown. The support 10 is provided with a transverse series of pockets 13, preferably arranged in step relation providing a transversely inclined trough 14, having an outlet pipe 15 for the water, as clearly shown in Fig. 5. This outlet pipe may discharge to any suitable point.

Arranged upon the support 10 are a plurality of operating sets or units 16, which are identical, and only one of which will be described in detail. These sets or units are also disposed in stepped relation for the convenience of the operator in placing the glasses within and removing the same from the reciprocatory chucks to be described.

Each unit 16 comprises stationary journal boxes or bearings 17, which are bolted or otherwise rigidly secured to the support 10, as shown at 18. These bearings rotatably receive a horizontal tubular spindle 19, having a pulley 20 rigidly secured thereto and engaged by a belt 21, engaging a pulley (not shown) rotated by any suitable means. The pulley 20 is arranged between the bearings 17 and a thrust ball bearing 22 is interposed between the pulley 20, and the bearing 17 to the left. At the left end, the tubular spindle 19 is provided with a conical portion 23, increasing in diameter to the left or away from the bearing 17. The large end of this conical portion is slightly smaller than the exterior diameter of the tubular spindle 19, to permit of the passage of a nut 24, having screw threaded engagement with the end of the tubular spindle 19, as shown at 25. The function of the conical portion 23 is to cause the water which may accumulate upon this conical portion, interiorly and exteriorly, to be acted upon by centrifugal force and conducted away from the bearing 17, thereby preventing this bearing from being injured by the water.

Arranged adjacent the left end of the tubular spindle 19 is a vertical water receiving conduit 26, having a base 27 bolted or otherwise rigidly secured to the support 10. This housing is provided in its right side and near its top with a circular opening 27 receiving the conical portion 23. A plate 28 is secured to the opposite side of the housing 26, by screws 29 or the like, and there is an outlet opening 30 beneath this plate. The plate 28 carries a tubular boss or lug 31, receiving a water supply tube 32, having connection with a suitable source of water under pressure. This water supply tube is clamped stationary in the boss 31 by a set screw 33, the water supply tube extending longitudinally and concentrically through the tubular spindle 19, as shown.

The numeral 34 designates a housing arranged adjacent the bearing 17 to the right, this housing including a lower portion 35, which is vertically arranged and bolted to the lower portion of the bearing 17, as shown at 36. The housing further comprises an upper portion 37, which rests upon the lower portion and may be removed therefrom. The lower portion 35 carries upon its sides, exterior flanges 38 to receive the upper portion 37 which is provided upon its closed end with lugs 39, to contact with the exterior of the closed end of the portion 35.

At its right end, the tubular spindle 19 is provided with a conical portion 40, increasing in diameter to the right which serves to conduct water accumulating thereon, exteriorly or interiorly, to the right, away from the bearing 17. This conical portion also carries a cylindrical extension 41, which is screw-threaded to engage with a chuck 42, receiving a grinding stone 43, held in place by a bolt 44 or the like. This stone is provided centrally thereof with a water outlet opening 45, in communication with the water supply tube 32.

Each unit further comprises a pair of spaced horizontal guide rods 46, having their forward ends slidable within stationary sleeves 48, carried by a base 49, which is bolted to the support 10, as shown at 50. The rear ends of these guide rods 46 extend through sleeves 51 (see Fig. 8) rigidly secured to a bracket 52, the guide rods being slidable therein. The bracket 52 embodies a base 54, bolted to the support 10, as shown at 55.

Each unit further comprises a horizontal reciprocatory carriage 56, having sleeves 57 secured to its lower end, receiving the guide rods 46, and clamped thereto by bolts 58. The carriage 56 is provided at its upper end with a tubular head 59, receiving a tubular coupling 60 clamped therein by a set screw 61. The outer end of this tubular coupling is screw-threaded to receive thereon one end of a chuck 62, for receiving and holding the glasses, the same being provided at its open free end with an interior ring 63 formed of rubber or other fibrous material, to prevent the glass being broken.

The numeral 64 designates an ejector rod, which is clamped in the tubular head 65 formed upon the top of the bracket 52, by a set screw 66 or the like. This ejector rod is longitudinally adjustable and extends through the tubular coupling 60 into the chuck 52, to contact with the glass and eject the same through the forward open end of the chuck, when the chuck is moved to the extreme position to the right. A guard 64' covers the forward end of the ejector rod 64, and is secured to the tubular head 59.

Means are provided to limit the forward movement of the carriage 56, so that the forward end of the chuck 62 cannot contact with the stone 43, in the event that the glass should break or the chuck should not be holding a glass. Such means comprises a rod 67, slidably mounted through an opening 68, formed in the bracket 52. The forward end of this rod is rigidly secured to the carriage 56, and has screw threaded engagement therewith, as shown at 69. The rear end of this rod is screw-threaded, as shown at 70 receiving an adjusting nut 71, adapted to be shifted longitudinally upon the rod 67 and contact with the bracket 52. The rod 67 is provided between its ends with a flattened portion 72 (see Fig. 8) adapted to be engaged within a notch 73, of a latch 74, pivoted to the bracket 52, as shown at 75. When the carriage 56 is moved to the right or to the open position the flattened portion 72 will move in proximity to the latch 74, which may then be swung to the horizontal position so that the flattened portion will enter the notch 73. This latch will then hold the carriage 56 from returning to the closed position to the left, as the latch will engage the shoulders 76. It is thus seen that means is provided to lock each carriage and its chuck in the proper position.

Figure 3:
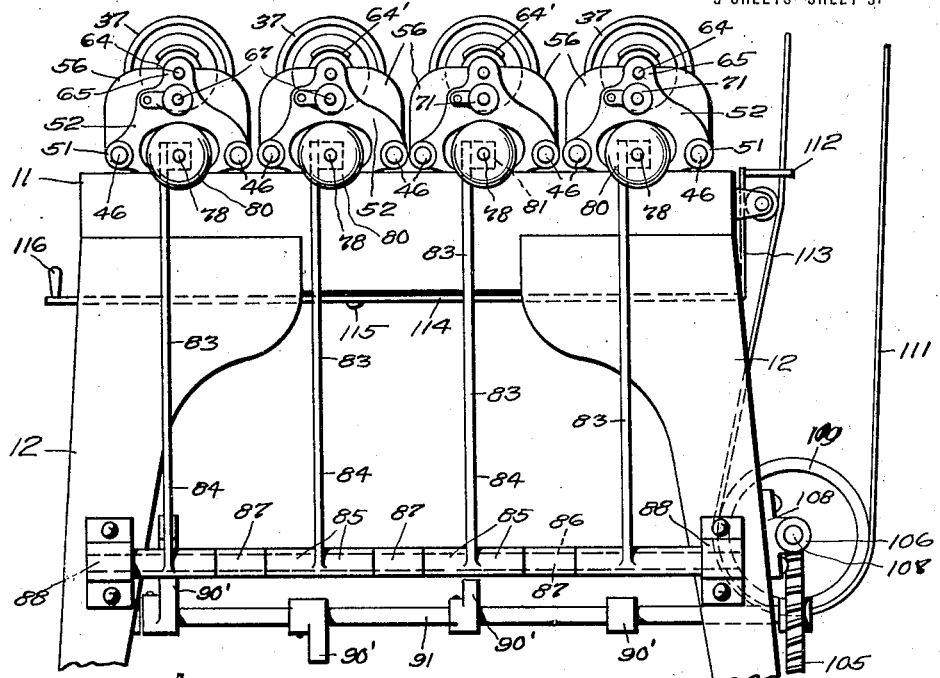
Fig. 3 is an end elevation of the machine, showing the cams.
Figure 4:
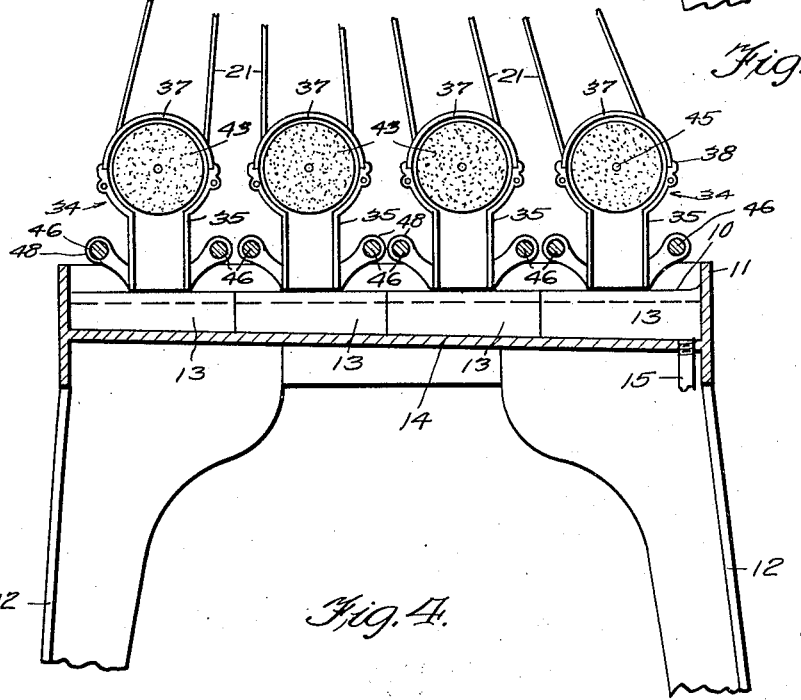
Fig. 4 is a transverse sectional view, taken on line 4—4 of Fig. 1.

Pivotally connected with the carriage 56, as shown at 77 (see particularly Fig. 6) are operating rods or pitmen 78, the rear end of which are screw-threaded, as shown at 79, for receiving adjusting nuts 80. Couplings 81 have openings to receive the rods 78 but have no screw-threaded engagement therewith and are adapted to slide thereon and upon the screw threaded portions. These couplings have pivotal connection, as shown at 82, with the vertical arms 83 of bell crank levers 84. As more clearly shown in Fig. 3, these bell crank levers are provided at their pivot points with sleeves 85 integral therewith, for pivotally receiving a supporting shaft 86, with spacing sleeves 87 arranged therebetween. This supporting shaft is held within brackets 88, bolted to the lugs 12, as shown. As more clearly shown in Fig. 5, the bell crank levers 84 include horizontal arms 89, the forward ends of which are forked for pivotally receiving rollers 90. These rollers 90 are adapted to contact with cams 90' rigidly secured to a transverse driving shaft 91, journaled through bearings 92. The horizontal arms 89 and the rollers 90 are heavier than the vertical arms 84, and thereby tend to automatically swing the bell crank levers to the left.

Figure 2:
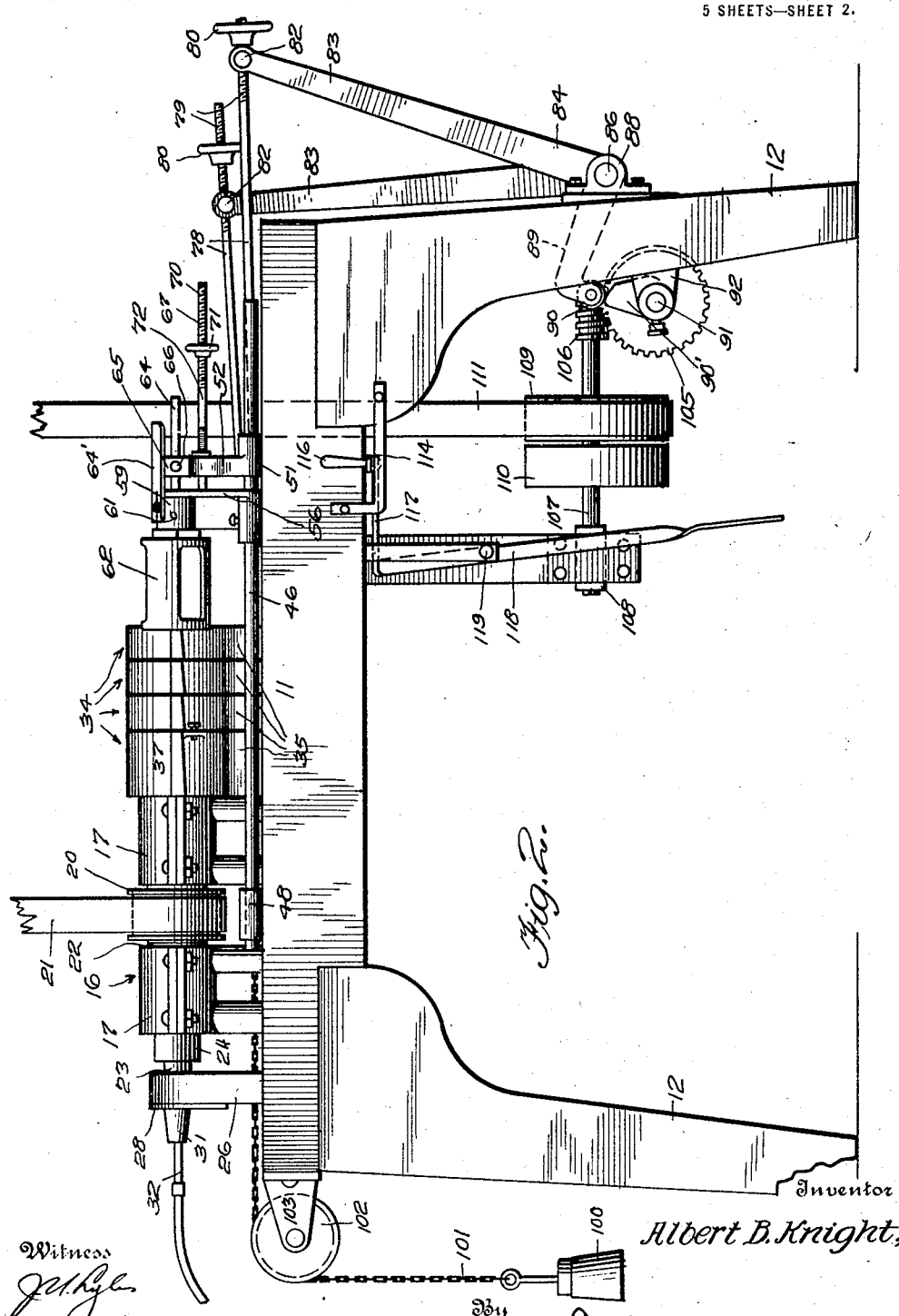
Fig. 2 is a side elevation of the same.

There are four cams 90', as there are four chucks to be operated, and these cams are set at 90 degrees apart. In Fig. 9, the precise construction of each cam is shown. The cam embodies a reduced face 93, extending between the points 94 and 94', and there is no contact between the roller 90 and the face 93 of the cam. This face 93 controls the time the glass is being ground, the carriage then remaining stationary and free from connection with the bell crank lever. Forwardly of the face 93 is a face 95, extending from the point 94 to a point 96, and this face contacts with the roller 90 to complete the forward movement of the carriage or chuck. Forwardly of the face 95 and at the point 96 is a pronounced hump, separating the face 95 from the face 97, extending between the point 96 and the point 98. The face 97 serves to quickly move the chuck in the first part of its forward travel, when the ejector rod is in the chuck and prevents the glass being inserted therein. When the roller contacts with the hump at 96, this produces a pronounced pause or stop in the movement of the chuck, for a sufficient length of time to allow the operator to conveniently place the glass in the chuck, the roller then traveling upon the face 95, which completes the forward movement of the chuck, until the roller becomes spaced from the face 93, while a glass is being ground. The numeral 99 designates the face which causes the rearward movement of the chuck, the same extending from the point 98 to the point 94', such face contacting with the roller 90. In Fig. 9, the cam is viewed from the rear side of the machine, as shown in Fig. 2.

The chucks are moved forwardly or to the left by weights 100, connected with cables 101, passing about pulleys 102 pivoted within brackets 103. These brackets are secured to the support 10. The cables 101 are attached to the rods 46, as shown at 104.

Means are provided to rotate the transverse shaft 91 continuously and at the proper speed comprising a worm wheel 105, engaged by a worm 106, carried by a shaft 107 journaled through stationary bearings 108. The shaft 107 carries a fast pulley 109, and a loose pulley 110 adapted to be engaged by a belt 111, receiving its movement from any suitable source. The belt 111 is shifted by a fork 112 (see Fig. 3), carried by the upstanding end 113 of a horizontally swinging lever 114. This lever is pivoted to the support 10 between its ends, as shown at 115. The opposite end of the lever projects upon the operating side of the machine and is provided with a handle 116 in convenient reach of the operator. The lever 114 has pivotal connection, near its handle 116 with a link 117, pivoted to the upper end of a vertically swinging lever 118, pivoted to the stationary support, as shown at 119. This lever has its lower end disposed near the floor to be actuated by the foot of the operator. It is thus seen that the driving shaft 91 may be stopped by shifting the belt from the fast to the loose pulley.

The operation of the machine is as follows:

During the rotation of the shaft 91, the cams 90' engage the rollers 90 of the several bell crank levers, and cause the chucks 62 to be moved in succession, each chuck being moved toward and away from the grinding stone 43. When the chuck is moved to the end of its rear position, the ejector rod 64 extends into the chuck and will eject the glass therefrom, which the operator catches in the hand placed at the open end of the chuck and near its bottom. A glass cannot now be inserted in the chuck as the ejector rod is in the way. The chuck is now moved forwardly rapidly, the roller contacting with the cam face 97, and by the time the forward end of the ejector rod moves from within the chuck, the hump at the point 96 of the cam is reached by the roller, causing a decided pause in the forward movement of the chuck, and during this pause the operator places a new glass within the chuck. When the roller passes this hump the face 95 completes the forward movement of the chuck and when the face 93 is reached such face disengages the roller and the period of grinding is reached. During this grinding period, the chuck is held in the forward position solely by virtue of the weight 100, the chuck not being now actuated by the bell crank lever. When the roller reaches the point 94', the face 99 starts the rearward movement of the chuck.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:

1. In apparatus for grinding glassware, a support, means connected therewith for holding and rotating a grinding element, a carriage connected with the support for movement toward and away from the grinding element, a chuck connected with the carriage, a pivoted lever, means effecting a loose connection between the pivoted lever and the carriage, means including a weight to move the carriage toward the grinding element, a cam to engage the pivoted lever, a lock rod connected with the carriage and provided with a stop shoulder, and a latch adapted to be shifted to a position in the path of travel of the stop shoulder.

2. In a machine for grinding the edges of glassware, a support, a pair of spaced bearings, a tubular spindle rotatable within the bearings and provided at its ends with conical portions increasing in diameter away from the bearings, means to rotate the tubular spindle, a chuck connected with one end of the tubular spindle for receiving a grinding element, a water supply tube extending through the tubular spindle, and means to move an article to be ground into contact with the grinding element.

3. In apparatus for grinding glassware, a support, means connected therewith for holding and rotating a grinding element, a carriage connected with the support for movement toward and away from the grinding element, a chuck connected with the carriage, a link having pivotal connection with the carriage and provided upon its free end with screw threads, a pivoted lever, means carried by one end of the lever slidably engaging the screw threads of said link, a member engaging the screw threads of said link and adjustable thereon, a cam to engage the pivoted lever and shift the same to engage said adjustable member and shift the carriage away from said grinding element, and means to move the carriage toward said grinding element.

4. In apparatus for grinding glassware, a support, means connected therewith for holding and rotating a grinding element, a carriage connected with the support for movement toward and away from the grinding element, a chuck connected with the carriage a bracket secured upon the support adjacent said carriage and upon the side thereof remote from said grinding element, means to move the carriage toward and away from said grinding element, means connected with the carriage and extending through said bracket for adjustably limiting the movement of said carriage toward said grinding element and means for adjustably limiting the movement of said carriage away from said grinding element.

5. In apparatus for grinding glassware, a support, means connected therewith for holding and rotating a grinding element, a carriage connected with the support for movement toward and away from the grinding element, a chuck connected with the carriage, a bracket secured upon the support adjacent said carriage and upon the side thereof remote from said grinding element, means to move the carriage toward and away from said grinding element, an opening formed in said bracket, a rod connected with said carriage and extending through said opening provided upon its free end with screw threads adapted to receive an adjusting nut for limiting the movement of said carriage toward said grinding element, a reduced portion on said rod, a latch pivoted adjacent the opening in said bracket and adapted to receive the reduced portion of said rod when the carriage is farthest removed from said grinding element, and means for adjustably limiting the movement of said carriage away from said grinding element.

In testimony whereof I affix my signature in presence of two witnesses.

ALBERT BREAKENRIDGE KNIGHT.

Witnesses:
WILLIS M. AMOS,
V. B. TUCKER.